United States Patent [19]
Emma et al.

[11] Patent Number: 5,291,442
[45] Date of Patent: Mar. 1, 1994

[54] METHOD AND APPARATUS FOR DYNAMIC CACHE LINE SECTORING IN MULTIPROCESSOR SYSTEMS

[75] Inventors: Philip G. Emma, Danbury, Conn.; Joshua W. Knight, Mohegan Lake, N.Y.; Kevin P. McAuliffe, Peekskill, N.Y.; James H. Pomerene, Chappaqua, N.Y.; Rudolph N. Rechtschaffen, Scarsdale, N.Y.; Frank J. Sparacio, Sarasota, Fla.

[73] Assignee: International Business Machines Corporation, Armonk, N.Y.

[21] Appl. No.: 606,242

[22] Filed: Oct. 31, 1990

[51] Int. Cl.⁵ .......................................... G06F 12/06
[52] U.S. Cl. ................................ 395/425; 395/400; 365/189.04; 365/230.01; 365/238.5; 364/DIG. 1
[58] Field of Search ............... 364/200, 900; 395/425; 365/189.04

[56] References Cited

U.S. PATENT DOCUMENTS

| | | | |
|---|---|---|---|
| 4,371,929 | 2/1983 | Brann et al. | 364/200 |
| 4,445,174 | 4/1984 | Fletcher | 364/200 |
| 4,484,267 | 11/1984 | Fletcher | 364/200 |
| 4,493,026 | 1/1985 | Olnowich | 364/200 |
| 4,503,497 | 3/1985 | Krygowski et al. | 364/200 |
| 4,527,238 | 7/1985 | Ryan et al. | 364/200 |
| 4,575,792 | 3/1986 | Keeley | 364/200 |
| 4,580,240 | 4/1986 | Watanabe | 364/900 |
| 4,586,133 | 4/1986 | Steckler | 364/200 |
| 4,622,631 | 11/1986 | Frank et al. | 364/200 |
| 4,633,387 | 12/1986 | Hartung et al. | 364/200 |
| 4,931,999 | 6/1990 | Umeki | 365/230.01 |
| 4,965,770 | 10/1990 | Yanagisawa | 365/238.5 |
| 5,007,022 | 4/1991 | Leigh | 365/189.04 |
| 5,016,168 | 5/1991 | Liu | 364/200 |
| 5,130,922 | 7/1992 | Liu | 395/200 |

OTHER PUBLICATIONS

K. So, "Multiple Level-Two Caches", IBM Technical Disclosure Bulletin, vol. 27, No. 4B, Sep. 1984.

*Primary Examiner*—Joseph L. Dixon
*Assistant Examiner*—B. James Peikari
*Attorney, Agent, or Firm*—Ratner & Prestia

[57] ABSTRACT

A system is provided for management of data in cache memories in a multiprocessor environment which allows portions of lines to be valid and exclusive, while other portions are valid, but not exclusive, or invalid. A processor may store into portions of a line under its exclusive control without invalidating copies of the line held in the cache memories of the other processors. The system includes at least two processors, a shared main memory and a system control element, and each processor has a corresponding cache memory, a modified line stack and a sectored line directory. The modified line stack identifies data lines which have been changed since being made resident in cache memory. It also identifies the status of change of each word within those lines. A "shared exclusive" flag in the system control element identifies each line for which portions of the line are under exclusive control of more than one processor. The sectored line directory identifies the control status and change status of individual words within a line flagged as "shared exclusive." If a line is shared exclusive, an entry for that line is recorded in the sectored line directory. For those lines with entries in the sectored line directory, a processor may store into words within its exclusive control, and fetch words within its exclusive or read-only control. Remote processors may fetch words which are held read-only by the local processor, and store into words which are marked invalid in the cache memory of the local processor.

17 Claims, 12 Drawing Sheets

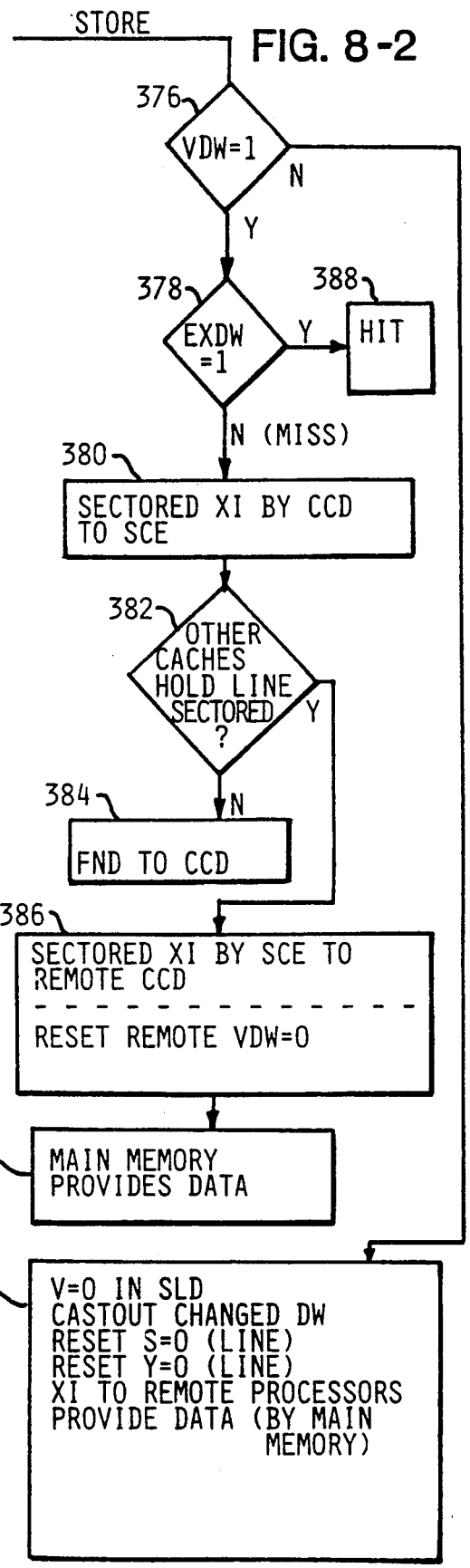

METHOD AND APPARATUS FOR DYNAMIC CACHE LINE SECTORING IN MULTIPROCESSOR SYSTEMS

FIELD OF THE INVENTION

This invention relates generally to cache memory management techniques and particularly to control of cache memories in a multiprocessor (MP) data processing system, where each processor has a private cache and shares a common main memory (MM).

BACKGROUND OF THE INVENTION

A cache memory is a memory that is packaged as an integral component of a processing unit in a computer system. The cache is generally much smaller than main memory. Its purpose is to serve as a buffer between the processors and the memory, emulating the main memory, but with a much faster access time. Since the cache is smaller than main memory, it can only contain a subset of the contents of main memory at any one time. A directory is used in a cache to identify which parts of the main memory are resident in the cache.

The methodology for selecting which data to keep in the cache is a heuristic one based on empirical observations of two observable phenomena. These are "temporal locality of reference," the observation that a referenced item is likely to be referenced more than once within some temporal window, and "spatial locality of reference," the observation that items close (by address) to a referenced item are each likely to be referenced within the temporal window.

Temporal locality of reference is the rationale for keeping the most recently referenced items in the cache, e.g., the cache is managed such that newly referenced items replace items that are least recently referenced. Spatial locality of reference is the rationale for storing contiguous "chunks" of data (called cache lines) in the cache rather than merely the specific items that have actually been referenced. For example, in response to a cache miss, an entire line (e.g. 32 words) is typically transferred from main memory to the cache. Typically, lines that contain instructions tend to exhibit more spatial locality of reference and lines that contain data tend to exhibit more temporal locality of reference.

For a cache of fixed capacity, the most important parameters in the cache design are the linesize (i.e. the number of words in each cache line) and the cache management strategy. The choice of linesize is based on a compromise between exploiting temporal and spatial locality of reference. A large line size exploits spatial locality, but limits the number of lines which may be stored for a fixed cache capacity. This shortens the length of time before any given line will be returned to memory, sacrificing temporal locality.

A large line size increases the cache miss penalty. The cache miss penalty includes the amount of time needed to recognize a cache miss (a reference, by a processor, to an item not currently stored in cache) and to transfer a line from main memory to cache. It is undesirable to make the linesize greater than that required to exploit spatial locality of reference. On the other hand, if the line size is too small, spatial locality is sacrificed and cache misses are more frequent. The size of the cache directory is another consideration in selecting the line size. In general, the size of the cache directory is proportional to the number of lines in the cache.

An existing technique for reducing the cache miss penalty in uniprocessor systems is cache sectoring. This technique was used in early commercial cache systems, such as the IBM S/360 Model 85. In this system, the linesize was relatively large compared to present day machines, introducing the potential for excessive cache miss penalty. In the sectoring technique, a cache line is considered to be composed of "sectors," where the sector size is typically a multiple of the width of the bus between the cache and the main memory. When a cache miss occurs, enough space is reserved in the cache to hold the entire line, but only the sector that contains the referenced item is transferred to the cache. Using this technique, a small directory is maintained with a large linesize, without incurring an excessive miss penalty.

The only change to the cache directory that is required to implement a sectored cache in a uniprocessor system is that each directory entry (corresponding to a line) contains one "residence" bit per sector in the line. These bits indicate which of the sectors in the line are resident in the cache.

Sectoring in uniprocessor systems can also be motivated in an environment where there are two classes of lines: one with a large spatial locality (e.g., instruction lines), and another with a smaller spatial locality (e.g., data lines). In such an environment, a miss to an instruction line can cause the transfer of the entire line, thereby avoiding superfluous misses in the future; a miss to a data line can cause the transfer of only the relevant sector, avoiding superfluous miss penalty.

The cache management strategy includes a replacement algorithm, typically a variant of the Least Recently Used (LRU) strategy. For multiprocessor systems, the cache management strategy also includes algorithms that determine ownership of lines such that the processors in the system share a coherent view of storage. Coherency implies that store operations to a memory location performed by a given processor will be observed by fetch operations done to the same memory location by another processor. Coherency provides a means for determining when cached data in a given processor becomes obsolete as a result of store operations performed by another processor.

In many systems, coherency is accomplished through the use of "exclusive" bits. Each entry in the cache directory contains an exclusive bit. If this bit is set in the cache directory of a given processor, then no other processor may have the corresponding line in its cache. If this bit is not set in the cache directory, other processors may have copies of the corresponding line but no processor may store data into the line.

A line is said to be "held exclusive" if the directory entry of the line has the exclusive bit set. A processor may only store into a line which is held exclusive. When the store operation occurs, the line is marked "changed" by setting a "changed" bit in the directory entry for the line. If the exclusive bit is not set for a resident line, then the line is said to be "held read-only."

When a line that is changed by a cache is written back to main memory, it is said to be "castout," and this operation is also called a "castout." A "cross invalidate" (XI) is the act of invalidating, or marking non-resident, a line in the cache of a remote processor. A "change exclusive to read only" (CERO) operation causes a remote processor to change the status of a line from held-exclusive to read-only by resetting the exclusive bit. When an XI or a CERO is performed on a line that has changed since it was placed in the cache, the line must be castout. A typical coherency scheme using exclusive bits is as follows:

Fetch operations are permitted from all resident lines. A fetch request that generates a miss eventually results in the line being held read-only. If the line is held exclusive by a remote processor at the time of the miss, then a CERO is issued to that processor and a castout is performed prior to sending a copy of the line to the requesting processor. This ensures that the processor that generates the miss receives a current copy of the line.

Store operations are only permitted to resident lines that are held exclusive. A store request that generates a miss eventually results in the requested line being held exclusive. If the line is held exclusive by a remote processor at the time of the miss, then an XI is issued to that processor which performs a castout operation on the line prior to sending a copy of the line to the requesting processor. If the line is held read-only by any remote processors at the time of the miss, then XIs are issued to all such processors prior to sending a copy of the line to the requesting processor. These XIs cause the remote processors to mark the line invalid. This step ensures that no other processor can fetch from this line without missing. If a remote processor does miss subsequently, then it will be able to observe any stores that have been done by the local processor.

A store operation that is attempted to a resident line that is held read-only will first cause XIs to be issued to any remote processors which hold the line read-only; this procedure is similar to the one followed when a remote processor holds the line exclusive. In this case, however, no other processor can hold the line exclusive, because this line is resident in the local processor to begin with. In this context, the act of obtaining the line exclusive is called "fetch no data," or FND.

The discussion thus far has described the operation of store-in caches. A store-in cache is one in which store operations cannot be done to lines that are not resident in the cache. If a store request is made to a nonresident line, then a miss is generated, and the line is brought into the cache before the store is permitted. Further, that store operation and other store operations done to the line during its period of residency are not reflected in main memory until the line is castout. Since multiple store operations may be made to the line while it is resident, the order in which store operations are done to the line cannot be determined at the time of the castout; all store operations appear to the system to have been done simultaneously at the time of castout.

To guarantee coherency in a store-in cache, exclusive control is required. While a processor is storing data, it is not possible for any other processor to observe these changes, so the changes cannot be observed in a haphazard order. If another processor attempts to observe a change (via a CERO request that will force a castout), then it is guaranteed to observe all changes that have logically taken place. Thus exclusive control is implicit to any store-in cache.

Store-through caches, on the other hand, do not need exclusive control. A store-through cache is one in which main memory is updated each time a store operation occurs. Castouts are not needed in store-through caches, since main memory is made consistent as store operations occur. There are three basic types of store-through caches: Write-Through, Write Allocate with exclusive management (WTWAX), Write-Through, Write Allocate without exclusive management (WTWA), Write-Through, No Write Allocate without exclusive management (WTNWA).

A WTWAX cache operates like a store-in cache, except that the store operations store through to main storage at the time that they are issued, and consequently, there are no castouts. Since each store operation is issued to main memory as a separate event only one processor at a time may store to a given line. All memory operations from the cache memories of the various processors are channeled through a system control element (SCE). The SCE always honors the stores from a given processor in the order that they are issued. No special actions are taken to preserve the order.

A WTWA cache operates like a WTWAX cache, except that there is no exclusive management. Without exclusive management, the processor must follow more stringent rules to ensure coherency between caches. For example, following a store request by a processor to the SCE, the SCE must determine whether the line resides in other caches. If so, the SCE must command the other caches to invalidate their copies of the line and wait for an acknowledgement that the copies are invalidated before storing the new data into main memory. The SCE must then notify the initiating processor that the store has occurred.

The WTNWA cache is similar to the WTWA, with one further simplification: lines are not allocated on stores. That is, a store to a nonresident line does not generate a miss (which would cause the line to be retrieved from main memory before the change is stored-through).

In all of the cache management strategies discussed above, the act of storing a line causes copies of that line to be invalidated in remote caches in order to maintain coherency. If a remote processor subsequently attempts to store into the same line as the local processor, a miss is generated and the current copy of the line in the cache memory of the local processor is invalidated. This can result in inefficient use of cache if two or more processors are operating on different words in the same line (hereinafter referred to as "close write sharing"). Although no two processors are operating on the same words, the line will "Ping-Pong" between the caches via misses and XIs each time a different processor fetches or stores to the line.

U.S. Pat. No. 4,445,174 to Fletcher features one possible solution to the close write sharing problem for multiprocessing systems. In Fletcher, each processor has its own cache, and an additional shared cache is provided. Read-only copies of the same line may exist in all private caches simultaneously. Lines that are both shared and changed are stored in the common shared cache, into which each processor can store, and from which each can fetch. A miss in the local private cache may cause the transfer of a line from a remote private cache to the shared cache. In such a case, the miss penalty from the transfer is smaller than the miss penalty due to retrieving the line from main memory.

U.S. Pat. No. 4,484,267 to Fletcher features a hybrid cache system in which "shared" lines are treated as in a WTWAX store-through cache, while "non-shared" lines are treated as in a store-in cache. New lines added to the cache are treated as store-in. When a second processor initiates a fetch from or store to this line, the line is changed to a store-through line. This hybrid system allows the non-shared lines to gain the performance advantage of the store-in cache with a minimal number of castouts. For the shared lines, the first CERO or XI that causes the line to change from store-in to store-through causes a castout. Subsequent CEROs and XIs change exclusive control, but do not cause castouts and the associated delays. A shortfall of this system is that, following a store to cache, a line cannot be accessed by the local or remote processors until the line has been stored-through to main memory. Also, when a line is shared, a store to the line by a processor invalidates the line in the cache memory of every remote processor, causing the remote processor to fetch the line from main memory on a subsequent reference.

SUMMARY OF THE INVENTION

Previously, in multiprocessor systems with store-in cache, coherency was maintained by allowing only one processor at a time to gain exclusive control over the double words (DWs) in a line. In a close write sharing situation, two or more processors could repeatedly encounter delays casting out and retrieving the same line even though the processors were not operating upon the same word(s).

The present invention is embodied in a dynamic cache sectoring system in which each processor in a multiprocessing system has a private cache with exclusive management and there is a shared common main memory. The system allows concurrent store and fetch operations to different words in the same line by multiple processors.

Each processor which is coupled to the dynamic cache sectoring system has a modified line stack (MLS) the contents of which identify the lines in the cache into which the local processor has recently stored data. After a line is brought into a cache, the first subsequent store to that line by the local processor results in the creation of an entry in the MLS identifying that line as recently changed. The MLS also identifies which double words within each line have been modified since being entered in the MLS.

Each processor also maintains a sectored line directory that records those lines for which different processors are fetching from or storing to a disjoint set of DWs. When a remote processor accesses a recently changed line (i.e., one for which an entry exists in the MLS), a check is made to determine if the remote processor is accessing the same DW changed by the local processor, or a different DW. Only in the latter case is the line eligible for sectoring.

The lines may be divided into sectors, where a sector contains one or more DWs. The system allows a sectored line to be held "shared exclusive," so that individual sectors may be held exclusive (for store access) by different processors. Fetch and store operations by multiple processors do not cause a shared-exclusive line to be castout, unless a processor attempts to fetch from or store to a sector which is held exclusive by a remote processor.

BRIEF DESCRIPTION OF THE DRAWINGS

FIG. 5-1-5-2 is a flow diagram showing the process by which fetch, store, CERO and XI operations are typically performed in the cache system shown in FIG. 2.

FIG. 7-1-7-2 is a flow diagram showing how a cache line is sectored to allow shared exclusive control in the cache system shown in FIG. 1.

FIG. 8-1-8-2 is a flow diagram showing how the fetch, store and cross-invalidate operations are performed on sectored lines in the cache system shown in FIG. 1.

DETAILED DESCRIPTION OF THE PREFERRED EMBODIMENT

The following is a description of an exemplary dynamic cache sectoring scheme in accordance with the present invention.

Overview

Figure 1:
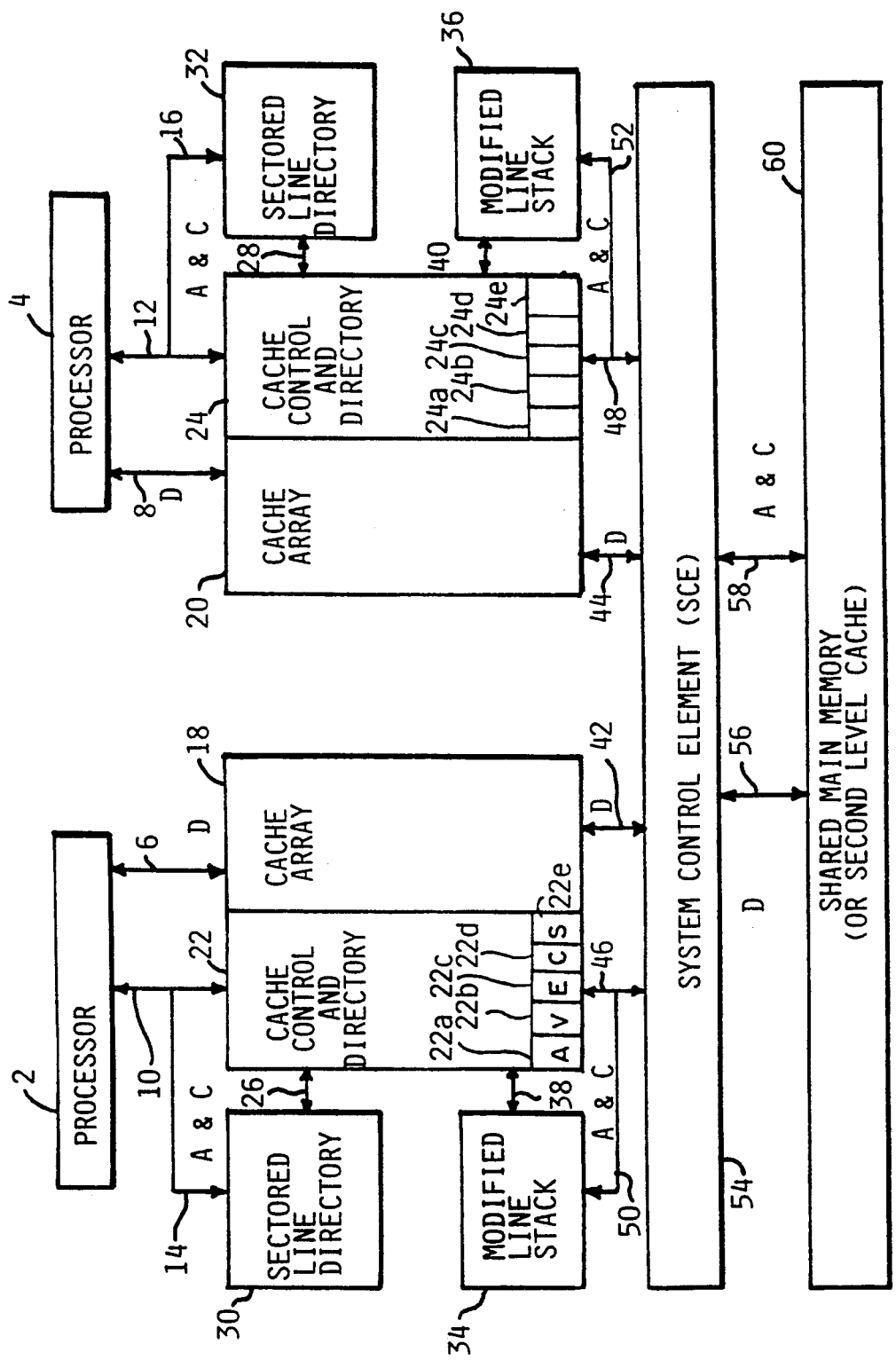
FIG. 1 is a block diagram of a store-in cache system which includes a modified line stack and a sectored line directory to allow dynamic cache sectoring.

The present invention is embodied in a multiprocessor system as shown in FIG. 1. In this system, each processor has a private cache memory and the processors share a system control element and main memory. Each private cache includes a modified line stack and a sectored line directory.

In the absence of contention between processors for the use of a single data line, this system functions in a manner similar to prior art store-in caches. Double words may be fetched from the cache 18 or 20 if the line is resident in the cache and marked as valid in the cache control and directory 22 or 24; and a DW entry be stored into if it is marked as valid and as being under the exclusive control of the respective local processor 2 or 4.

Additional steps are performed which are not included in the prior art. When a line in cache is modified, its address is entered in the modified line stack 34 or 36, and the DWs which are modified are identified as changed in the MLS 34 or 36. When a remote processor attempts to access a line in local cache via a XI, the corresponding entry in the modified line stack 34 or 36 is checked. If the attempted access is for a DW in a sector which has not been recently modified (close write sharing), the line is marked as sectored. The line is entered in the sectored line directory of each processor, including identification of which sectors are available for read/write and read-only access for each respective processor.

Detailed Description

Figure 2:
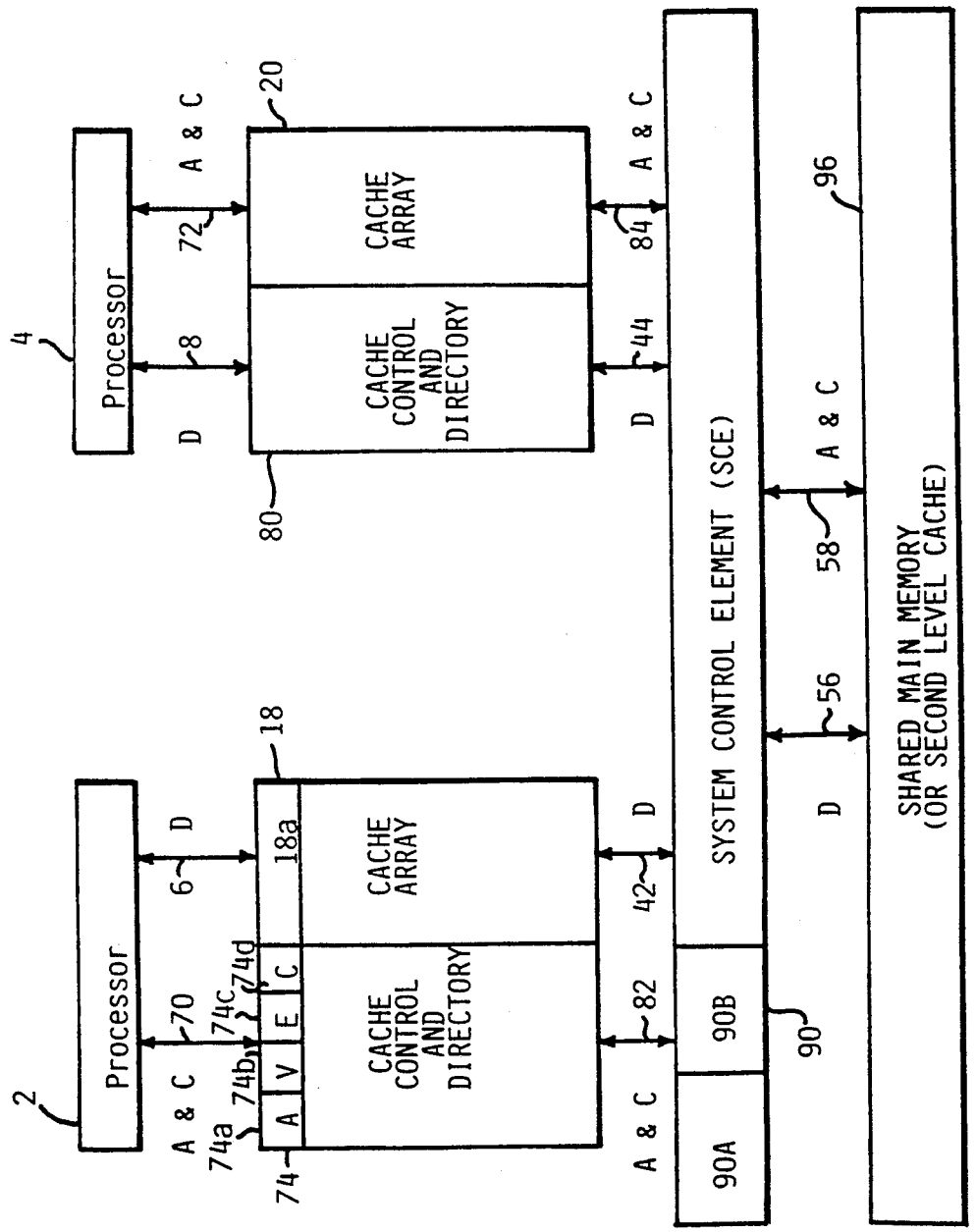
FIG. 2 is a simplified functional diagram of a prior art store-in cache system.

The present invention is best understood by including a comparison with the prior art. FIG. 2 is a block diagram of a prior art store-in cache system in a multiprocessor environment. Each of the processors 2 and 4 in the system has a private cache memory, 18 and 20 respectively, with a respective cache control and directory (CCD) 74 and 80. The system has a single system control element (SCE) 90 and a shared main memory 96.

Each bus 18a in cache 18 has an associated entry in the cache control and directory 74. The CCD entry includes the address (A) of the bus 74a, and three flag bits 74b–d which indicate the status of the cache resident line. These flag bits are the "valid" (V) bit 74b, the "changed" bit (C) 74c, and the "exclusive" bit (E) 74d. If the V bit 74b is set to one, the line is usable. If the V bit 74b is zero, the line may not be accessed for fetching or storing. At system initialization, all V bits are reset to zero. The C bit 74d is set when the line in the cache is changed by a store operation.

System control element 90 includes copies of all of the private cache control directories. For example, the items marked 90a and 90b are copies of the respective CCDs 74 and 80.

Figures 1, 5:
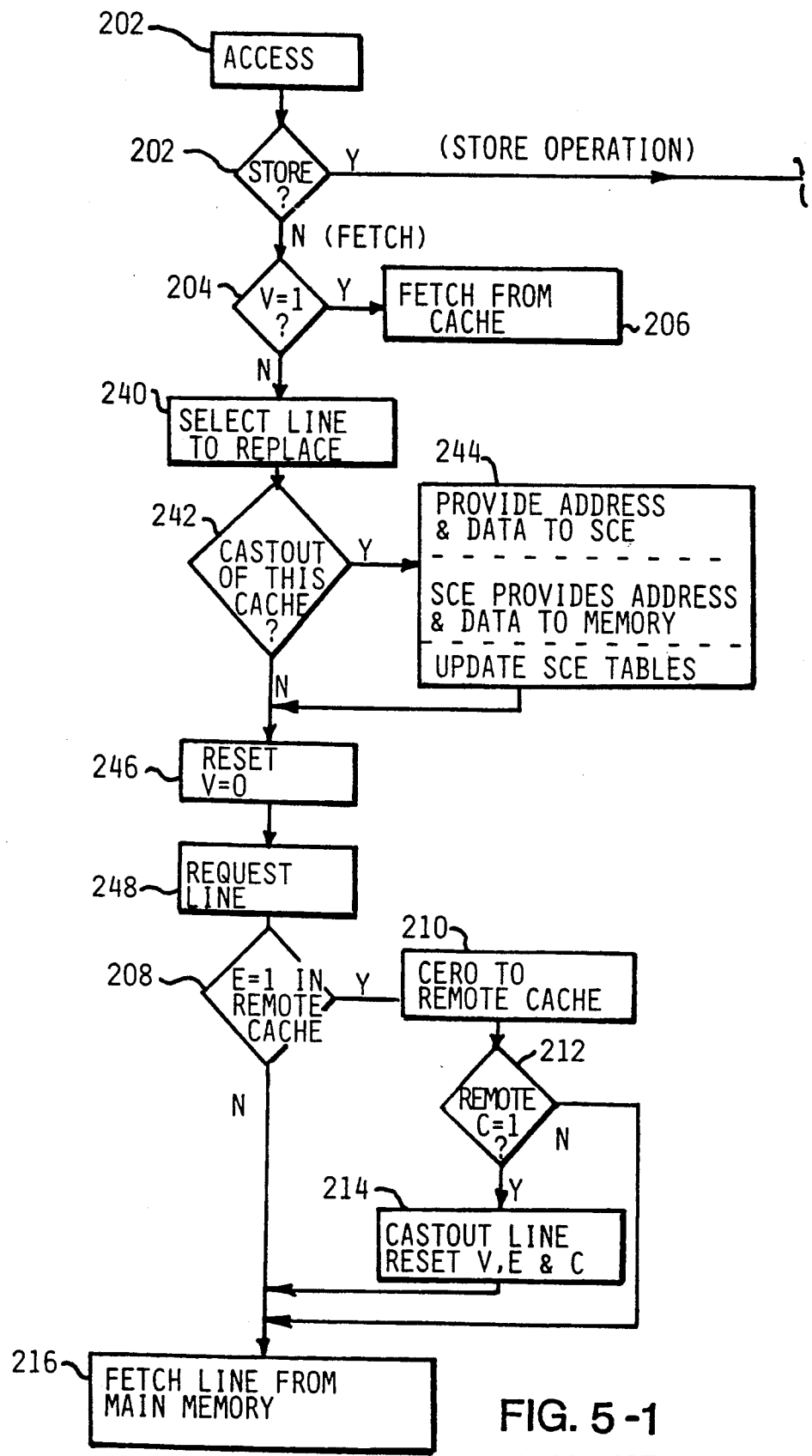
Figures 2, 5:
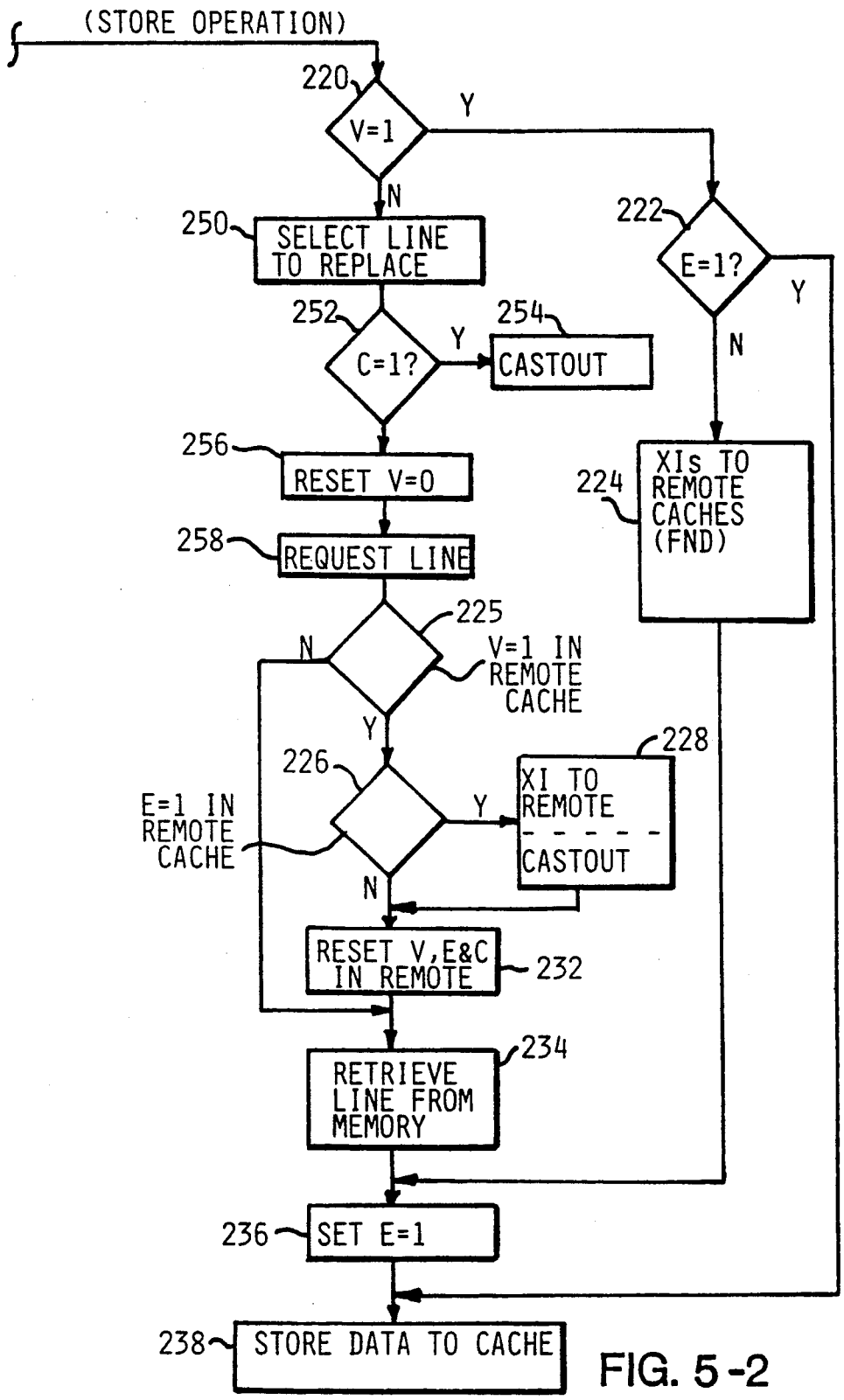

FIG. 5 shows the process by which fetch, store, CERO and XI operations are typically performed in the prior art cache system shown in FIG. 2. At step 200, the processor 2 transmits a request for data to the cache control and directory 74 over bus 70. The request includes both the address 74a of the data requested and the type of request (fetch or store). If, at step 202, the request is not a store request, then it must be a fetch request.

The CCD 74 at step 204 determines if the line containing the requested data is resident in the cache 18. If the V bit 74c for the requested line is set, then the line is resident in cache 18 and is usable. This is a fetch hit. bus 18a is transferred from cache 18 to processor 2 over bus 6 at step 206.

If the line is non-resident at step 204, the cache control and directory selects a line in the cache 18 to replace with the requested line at step 240. If the line to be replaced is marked as changed at step 242 (indicated by change bit 74d), the cache control and directory 74 transmits the address and the information that a castout is needed to the system control element 90 over bus 56 and subsequently transfers the data over bus 42 at step 244. The SCE passes the address (via bus 58) and data (via bus 56) to main memory 96. Having copied the castout line to main memory, the castout line is invalidated (V bit 74b is reset to zero) at step 246.

If the line to be replaced is not changed at step 242 (C bit 74d equals zero), then the V bit 74b is reset to zero immediately and there is no need to write the discarded line back to main memory 96.

Having made space available in the cache 18, the CCD 74, at step 248, issues a request for the line containing the required data to the SCE 90 over bus 82. The SCE 90, at step 208, consults its directories for the other cache memories (e.g. 90b), to see if the line is held exclusive in any other cache 76. If so it requests the remote cache control and directory 80 to perform a change-exclusive-to-read-only (CERO) operation on the line at step 210.

If the line has been changed at step 212, the changed data is transmitted from the remote cache array 20 to the SCE 90 via bus 44, and the SCE passes the address over bus 58 and the data over bus 56 to the main memory 96, at step 214. After the line is castout, the remote cache control and directory 80 resets the V, E and C bits to zero in the CCD entry for the castout line. At step 216, The SCE 90 then proceeds as it would have, if no cache held the line exclusive, and issues a request to main memory 96 over bus 58 for the line.

In response to the fetch request, the data is transferred to the SCE over bus 56 and then to the cache array 18 over bus 42 and the SCE updates its internal tables 90a–b. The CCD then sets the V bit to one and the E and C bits to zero in the corresponding CCD entry for the line. Then the requested data is transmitted to the processor 2 over bus 6.

If, at step 202, the request is a store, the address of the requested location and the request type are transmitted to the CCD 74, as for a fetch request. In order to access the bus 18a for a store, the V bit must be one at step 220, and the E bit must also be one at step 222.

If the V bit is set to one but the E bit is zero at step 222, another cache may have a read-only copy of the line. In this instance, a fetch-no-data (FND) command is issued, at step 224, to allow the cache 18 to gain exclusive control over the line. Responsive to this command, the CCD 74 transmits an XI for the line in the remote cache 20, to the SCE 90 over bus 82. The SCE 90 determines from its internal copies of the other directory 80 if the line is held read-only in another cache 2. In this case it is necessary to invalidate that line in remote cache 20. If the V bit for the line in the CCD 80 is one, the line is held read-only by processor 4, and SCE 90 transmits the request over bus 44 to the remote CCD 80 at step 224. Since the V bit for the line in the CCD 74 is set to one, remote processor 4 could not have had exclusive control of this line; nor could processor 4 have modified the line.

Once the remote CCD 80 has reset the E bit for the requested line, SCE 90 updates its internal copy of the directories and notifies CCD 74 over bus 82. The E bit for the line in the CCD 74 is set to one at step 236 and processor 2 has exclusive control over the line. Processor 2 can now transfer the data over bus 6 to cache 18 at step 238.

If the requested line is not present in local cache 18 at step 220, the cache control and directory at step 250 selects a line in cache 18 to replace with the requested line. If the line to be replaced is changed at step 252 (as indicated by C bit for the line), the cache control and directory 74 transmits the address and the information that a castout is needed to the system control element 90 over bus 56 and subsequently transfers the data over bus 42 at step 254. The SCE passes the address (via bus 58) and data (via bus 56) to main memory 96. Having copied the castout line to main memory, the castout line is invalidated (i.e. its V bit is reset to zero) at step 256.

If the line to be replaced is not found to be marked as changed at step 252 (i.e. its C bit equals zero), then the V bit for the line is reset to zero immediately since there is no need to write the discarded line back to main memory 96.

Having made space available in the cache 18, at step 258 the cache control and directory 74 issues a request for the line containing the requested data over bus 82. The SCE consults its directories 90b to see if the line is resident in any other cache 76 at step 225. If so, step 226 issues a cross-invalidate (XI) operation to the remote cache 80, causing it to castout the line if it was held exclusive and changed and to reset its V bit.

The SCE 90 then proceeds as it would have if no cache held the line and issues a request to main memory 96 over bus 58 for the line at step 234. The data is transferred to the SCE over bus 56 and then to the cache array 18 over bus 42. At step 234, the SCE also updates its internal tables 90a–b. At step 236, the cache control and directory 80 sets the V, E and C bits to one. The data value to be stored is then transmitted from the processor 2 to the cache 18 over bus 6.

FIG. 1 is a block diagram of an improved multiprocessor system which includes an embodiment of the present invention. Each of the processors 2 and 4 in the system has a respective private cache memory 18 and 20. Each of the cache memories 18 and 20 is coupled to a respective cache control and directory (CCD) 22 and 24; modified line stack (MLS) 34 and 36; and sectored line directory (SLD) 30 and 32. The system has a single system control element (SCE) 54 and a shared main memory 60.

The CCDs 22 and 24 differ from CCDs 74 and 80 in that CCDs 22 and 24 have an additional field, S, for each line in the respective cache array 18 and 20. The field S (22e) indicates that the line is "shared exclusive". CCDs 22 and 24, SCE 54 and main memory also differ from respective CCDs 74 and 80, SCE 90 and memory 96 in that there is additional logic in each of these devices to accommodate partial castouts and sector invalidates. Also the internal cache directory tables of SCE 90 are expanded to accommodate the possibility that multiple caches have exclusive use of parts of the same line.

Figure 3:
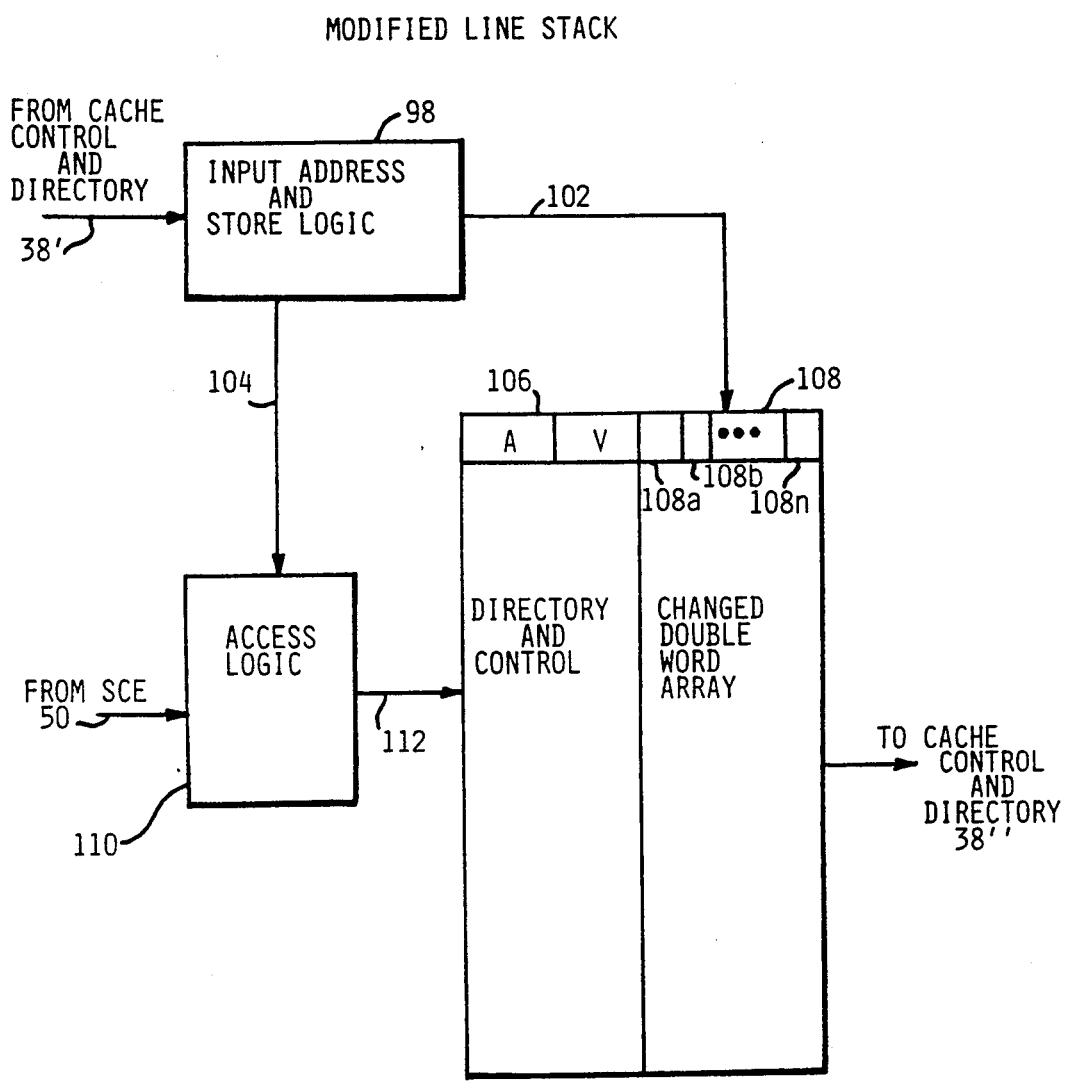
FIG. 3 is a block diagram of the modified line stack as shown in FIG. 1.

FIG. 3 shows the components of the modified line stack 34 in greater detail. The MLS includes input address and store logic 98, access logic 110, an MLS control and directory (MLSDC) 106, and a changed double word array (CDWA) 108. The MLSDC 106 and CDWA 108 operate like a cache control and directory and a cache array, respectively. The address which is stored in the MLSDC and is used to access an entry is the same as the address that is stored in the CCD 22. The corresponding "data" maintained for each entry in the CDWA 108 (within MLS 34) is a changed bit vector (CDW) 108a-n identifying which DWs in the corresponding line in the cache array 18 have been changed since the entry of the element in the MLS 34. The CDWA 108 only includes entries for lines which are not held shared exclusive (i.e., bit S in the line entry of the CCD 22 is zero). The changed double word bit vector, CDW 108a-n, in the CDWA 108 is modified in response to store activity in the cache control and directory 22, and is fetched during the processing of XI requests from the SCE 54.

The input address and store logic 98 performs two functions: 1) when a store is honored by CCD 22 for a line which is not held shared exclusive, the logic 98 provides the address of the store to the access logic 110; and 2) the input address and store logic 98 provides the location within the line of the DW that is being changed to the changed double word array 108. This location is used to update the changed word bit vector CDW 108a-n.

For stores performed by the local processor 2, the access logic 110 receives the address of the line being changed from input address and store logic 98 and provides the address to the MLSDC 106. For XIs from remote processors 4, the address of the line being invalidated is provided to access logic 110 from SCE 54 and access logic 110 provides the address to the MLSDC 106.

Figure 4:
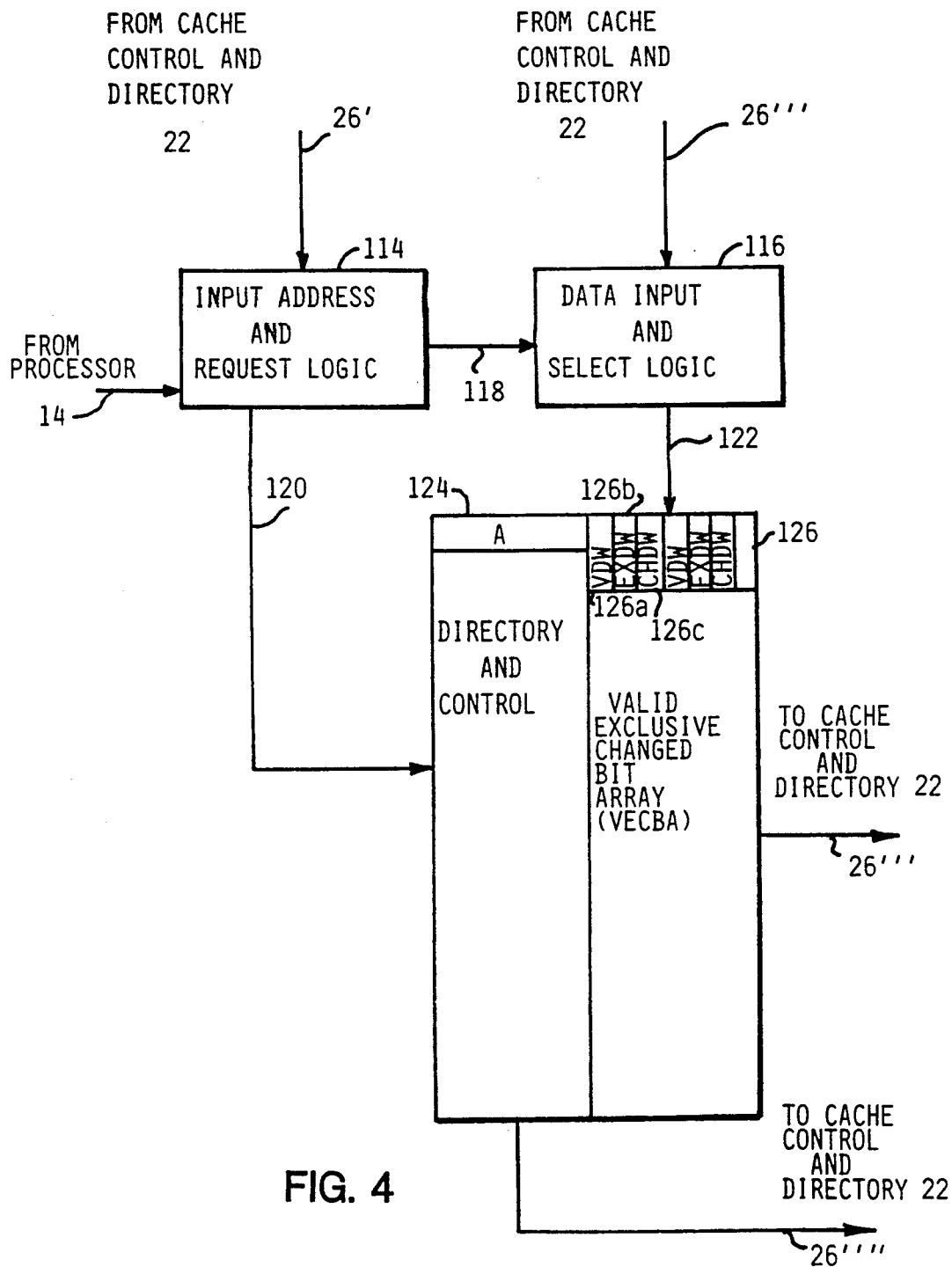
FIG. 4 is a block diagram of the sectored line directory as shown in FIG. 1.

FIG. 4 shows the components of the sectored line directory 30 in greater detail. The SLD 30 includes input address and request logic 114, data input and select logic 116, sectored line directory and control (SLDC) logic 124, and a valid exclusive changed bit array (VECBA) 126. SLDC 124 and VECBA 126 operate like a cache control and directory and a cache array, respectively. The address which is stored in the SLDC 124 and used to access an entry is the same address which is stored in the CCD 22. The corresponding "data" maintained for each entry in the VECBA 126 (within SLD 30) is a vector 126a-c which identifies the valid bit (VDW) 126a, the exclusive bit (EXDW) 126b, and the changed bit (CHDW) 126c for each sector within the line. The VECBA 126 only includes entries for lines which are held shared exclusive (i.e., bit S of the line entry in the CCD 22 is set to one). The VDW, EXDW, and CHDW data in the VECBA 126 are fetched and modified in response to cache requests from the processor 2 and from the cache control and directory 22.

The input address and request logic 114 performs two functions: 1) when a store is honored by CCD 22 for a line which is held shared exclusive, the address of the line is provided to the input address and request logic which provides it to the data input and select logic 116 and the SLDC 124; and 2) for XIs from remote processors 4, the CCD 22 provides the address of the line to the input address and request logic 116, which provides the address to the VECBA 126 to update the status of the affected line.

For store operations requested by the local processor 2, the input address and request logic 114 provides the address of the line being changed to the data input and select logic 116, which provides this address to VECBA 126. For XIs from remote processors 4, the address of the line being invalidated is provided to data input and select logic 116 from cache control and directory 22; and data input and select logic controls any changes in the VDW, EXDW, and CHDW table to the VECBA 126 caused by the XI commands.

The number of entries in the modified line stack 34 and in the sectored line directory 30 is determined by performance considerations and the available technology. It is contemplated that both will be much smaller than the number of lines in the cache 18. For example, a cache with 512 lines may have between 4 and 8 entries in the modified line stack and in the sectored line directory. If the performance of the system could be improved by adding more entries to the MLS 34 and SLD 30, then the assumption of spatial locality of reference would be violated and a cache with a smaller line size would be more appropriate.

Figure 6:
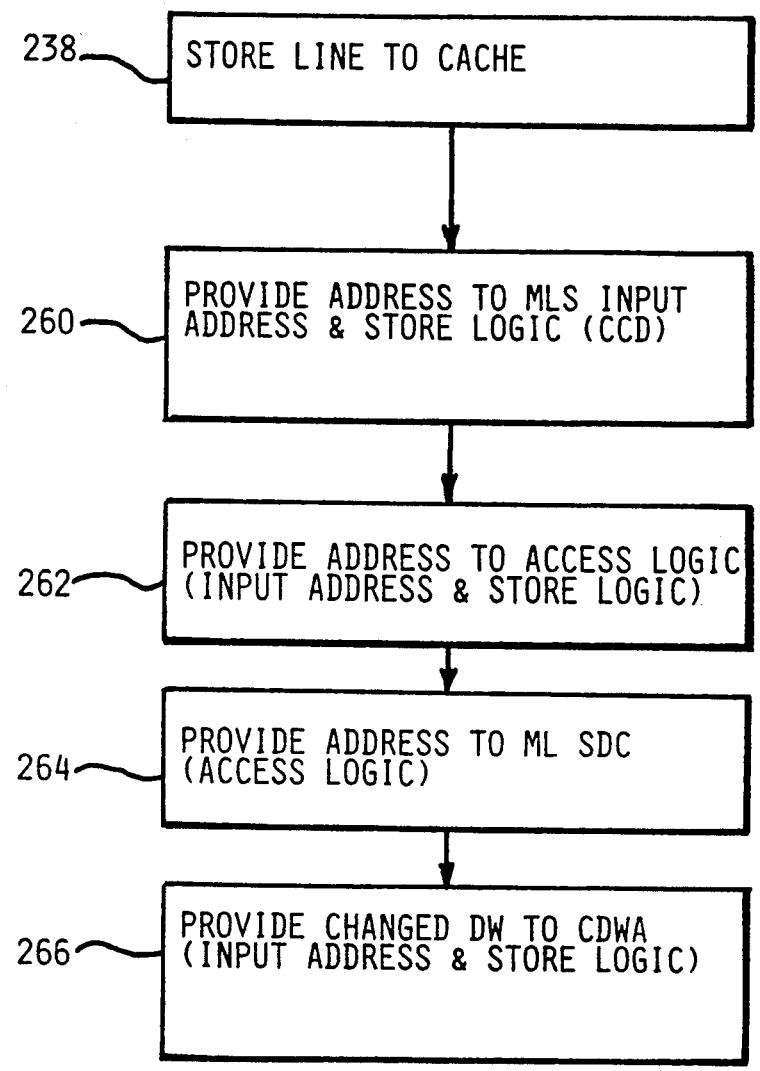
FIG. 6 is a flow diagram showing how the operation of adding a line to cache is modified in the cache system shown in FIG. 1.

FIG. 6 shows how the store operation (step 238 of FIG. 5) is modified when performed by apparatus including an embodiment of the present invention. With reference to FIG. 1, when any line is first brought into the cache 18, its C bit and S bit are zero. The line is not entered in the MLS 34 or the SLD 30. When a store operation to the line is honored at step 260 for a line with the S bit at zero, the address of the store operation is provided to the input address and store logic 98 on bus 38' (as shown in FIG. 3). At step 262, the input address and store logic provides the address of the line to the access logic 110 via bus 104. Access logic 110 then supplies this address to the modified line stack directory and control 106 over bus 112, provided no access requested by the SCE 54 is in progress. At step 266, the target DW within the line being changed is supplied to the CDWA 108 by the input address and store logic 98 over bus 102.

The MLS 34 thus retains a record of which double words have recently been changed in each line in the cache array 18 that has a corresponding entry in the MLS.

Figures 1, 7:
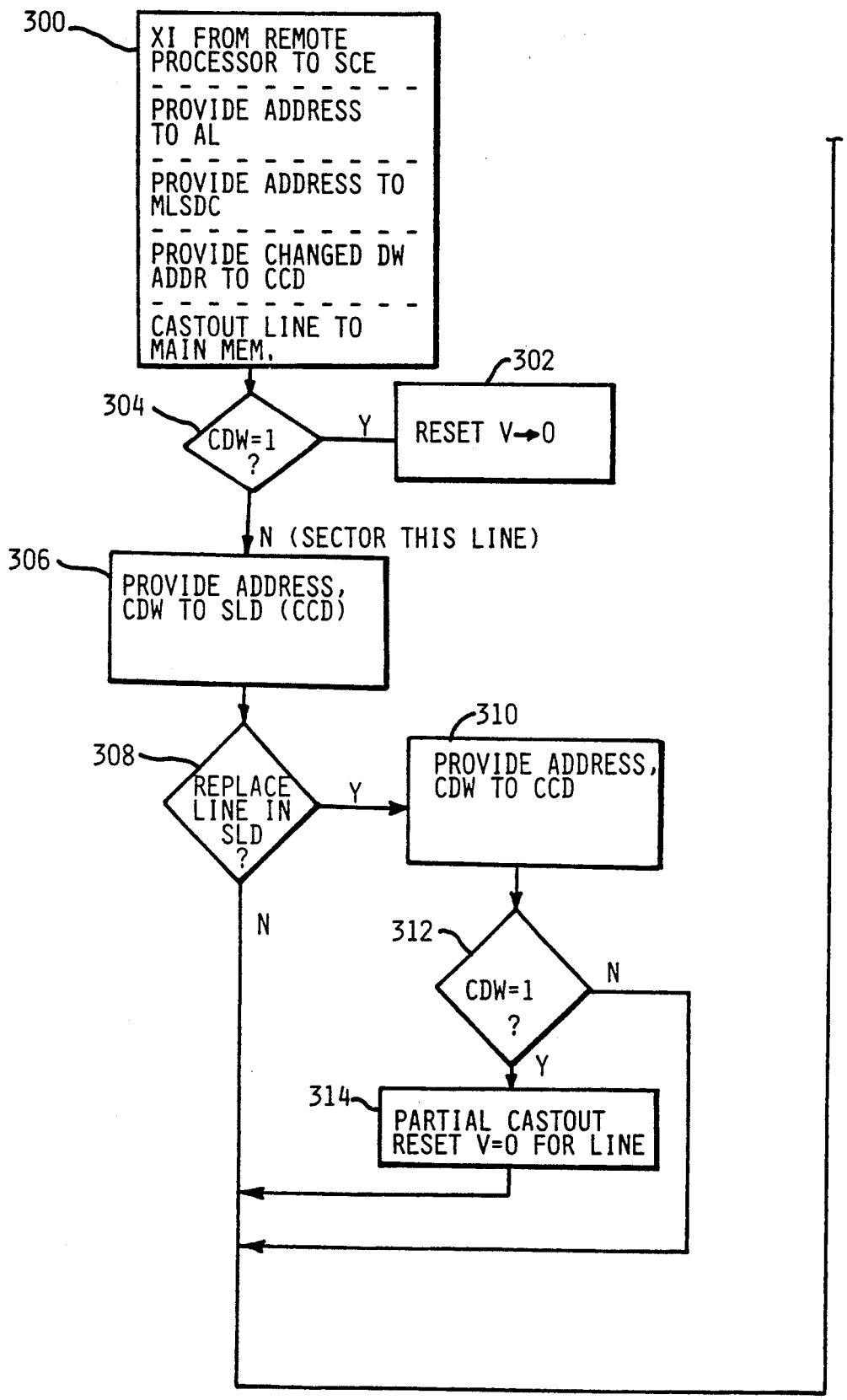
Figures 2, 7:
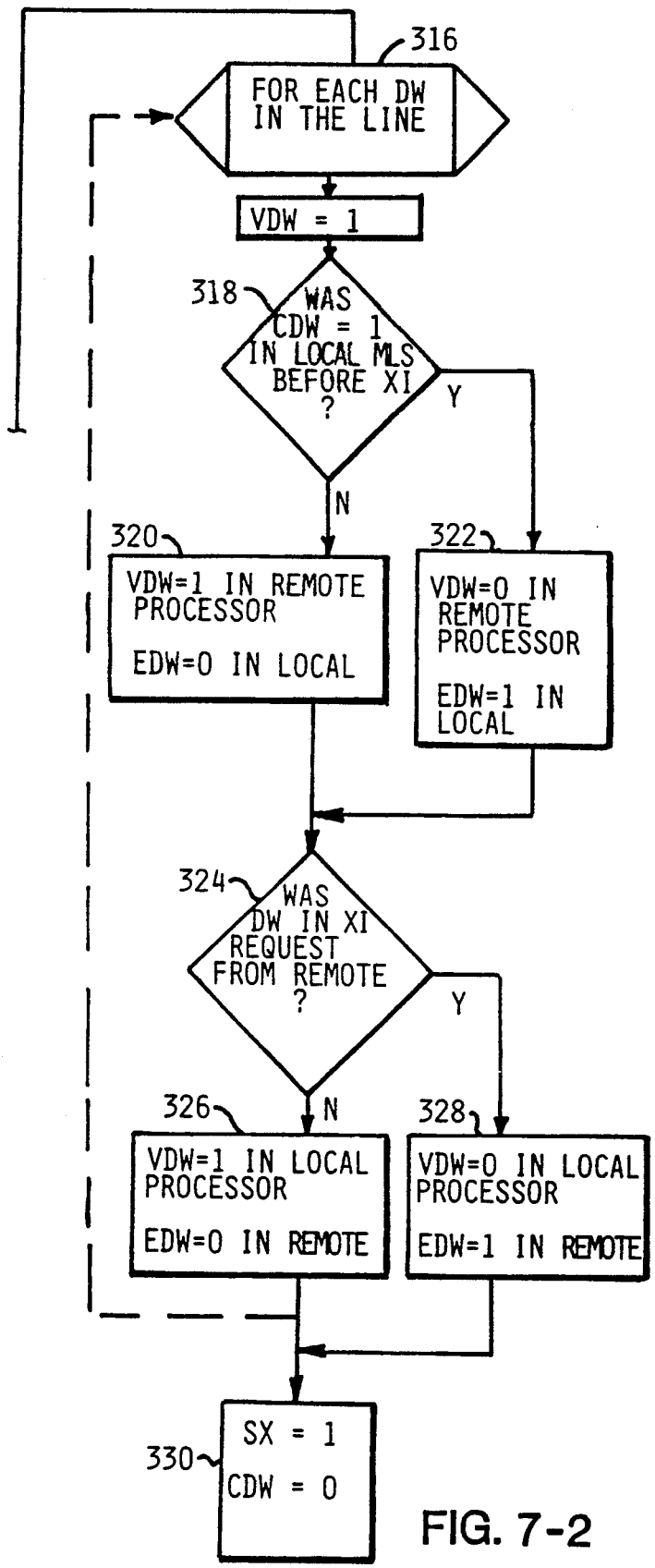

FIG. 7 shows the process by which a modified line is sectored and identified in the sectored line directory 30. Once a line is entered in the MLS 34, the entry will be updated with each store operation into the line by the local processor 2. These updates track which DWs in the line have been modified. At step 300, when a cross invalidate (XI) is received from the remote processor 4, SCE 50 provides the address of the cross invalidated line to access logic 110 via the bus 50. Access logic 110 provides this address to the MLSDC 106. If a valid entry exists in the MLS 34 for the requested line, then it has been recently modified. If the line has been recently modified, the address and the changed bit vector (CDW) 108a–n are provided to CCD 22 by the CDWA 108. As a final substep of step 300, the line is castout to main memory.

At this point, the entry in the MLS is marked invalid and the CDW 108a–n are reset to zero, as the MLS entry is no longer needed (the CCD 22 has the CDW information and can provide it to the SLD, if necessary). Thus, the MLS 34 is treated as a store-through cache in that the contents of the MLS may be discarded without copying them to another component.

A line having an entry in the MLS 34 must be castout before the associated line is accessed by the remote processor 4. This castout insures that the remote processor has up-to-date copies of the data in the line. At step 304, CCD 22 checks the XI requested address to see if the requested DW has been recently modified, as indicated by the CDW values 108a–n, previously provided by the MLS 34. If the requested DW has been recently changed, then, at step 304, the information from the MLS entry is simply discarded. This gives the remote processor 4 exclusive control over the entire line when the subsequent access occurs. This mechanism is substantially the same as in the prior art since sectoring of the line is unnecessary; this is not a case of close write sharing. There is no reason to sector this line, since a castout is needed to maintain coherency each time the same DW address is used for a store operation by a different processor.

If, however, the line has been recently modified, but the requested DW indicated by the XI command has not been changed, then the CCD 22 provides the address of the line for which the XI command was issued and the information about which double words have recently changed to the SLD 30 via bus 26. This address is also provided to the SCE 50 via bus 46, at step 306. This XI operation is said to have "hit in the MLS". This is the close write sharing situation.

When an XI hits in the MLS, the address of the line being sectored is provided by CCD 22 at step 30 to the input address and request logic 114 via bus 26' as shown in FIG. 4. If a line is to be replaced from the sectored line directory 30, at step 308, then the address and the vector of changed DWs are sent, at step 310, to the CCD 22 via busses 26''' and 26''''. If any of the DWs in the line being replaced in the SLD 30 has been changed at step 312, the CCD 22, at step 314, performs a partial castout to write the changed DWs back to main memory 60 and resets the V bit for the line to zero in the CCD 22. Although the information in SLD 30 is not the "data" which is stored in cache array 18, the SLD behaves like a store-in cache. Prior to deleting an entry from the SLD, it is necessary to castout all changed DWs in the line to ensure coherency.

At step 316, space is available in the SLD 30 to store a new entry. The information about which DWs in the newly sectored line have been changed recently and the address of the double word requested by the XI operation are provided by CCD 22 to data input and select logic 116 via bus 26''. Data input and select logic 116 provides the VDW, EXDW, and CDW information to VECBA 126, via line 122, and the input address and request logic 114 provides the address and a store request via line 120 to the shared line directory and control (SLDC) 124.

As stated above, both the MLS 34 and the SLD 30 operate in a manner analogous to a cache memory, although they contain pointers and control information, as opposed to data. When either the MLS 34 or the SLD 30 is full and an entry is to be added, a Least Recently Used (LRU) algorithm is used to select the entry to replace. LRU schemes are known in the prior art.

In the preferred embodiment of the invention, the number of misses and castouts is minimized by setting a sector EXDW bit to one only when this is necessary for a store operation. Thus, if a DW was recently changed by the local cache before the line was sectored at step 318, then, at step 322, the EXDW bit for that DW is set to one in the local VECBA 126 and the VDW bit is zero in the remote VECBA.

In the case where a line is to be sectored and a DW in that line has not been recently changed by the local cache before the line is sectored at step 318, the EXDW bit for that DW is reset to zero in the local VECBA 126 and the VDW bit is set to one in the remote VECBA, at step 320.

If the XI operation generated by the remote processor 4 requests store access to a DW at step 324, then, at step 328, the EXDW bit for that DW is set to one in the VECBA for the remote processor 4, and the VDW bit is reset to zero to invalidate the DW in the local VECBA 126. If, at step 324, it is determined that the XI is initiated in order to fetch a DW, then, at step 326, the EXDW bit for that DW is set to zero in the VECBA for the remote processor 4, and the VDW bit is remains set to one for the DW in the local VECBA 126. After either step 326 or 328, the S bit 22e in the CCD 22 is set to one to indicate that this line is now held shared exclusive.

One skilled in the art would understand that this set of rules merely exemplifies one possible cache management algorithm for implementing coherency in a sectored cache. It is contemplated that other variations of this cache management algorithm may be used. For example, it may be possible to reduce the frequency of sectored XIs which result in sectored FNDs by gaining exclusive status for sectors more aggressively. A processor which issues a sectored XI could be granted exclusive control over all sectors which are not held exclusive by any remote processors, instead of only providing exclusive control for the sector into which data is currently being, as described above.

Figures 1, 8:
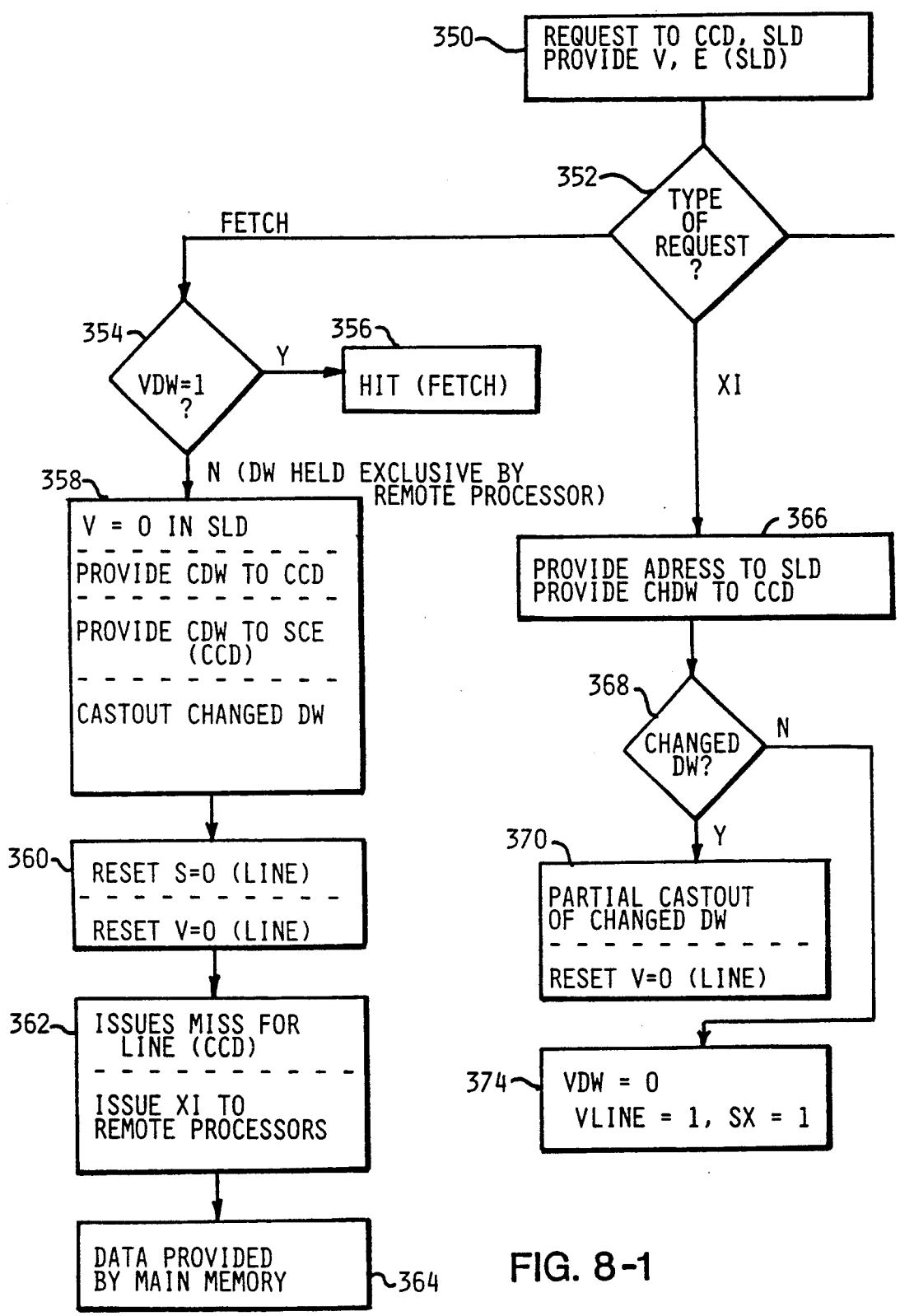

FIG. 8 shows how shared exclusive lines are accessed for fetch, store and XI operations. At step 350, a fetch request by the processor 2 is provided both to CCD 22 and to SLD 30 via bus 14. The SLD 30 responds to the request by conditioning the CCD 22 to examine the VDW 126a and EXDW 126b bits for the requested DW. If the VDW bit is set to one at step 354, it is a hit (If VDW equals one, then V 22b must also be one) and CCD 22 directs cache array 18 to send the data to processor 2 via line 6 at step 356.

If, however, the V bit 22b is one but the S bit 22e equals one and the bit VDW is zero, the DW is held exclusive by another processor 4 and the access will not be allowed. This is the case where both processor 2 and processor 4 are accessing the same word and one of these processors is modifying the data. In this instance a castout is required to maintain coherency.

In the first step of the castout operation, the address of the line and the changed double word bits are provided to CCD 22 by SLD 30 at step 358. CCD 22 then provides the address and changed DW information to the SCE 54 via the busses 46 and 42 respectively. The SCE 54 provides the addresses of DWs to be castout to main memory 60 via bus 58 and provides the changed DWs via bus 56. At step 360, the line is invalidated in the SLD (i.e. the VDW bits corresponding to the line are reset) which causes the CCD 22 to reset the bits V and S to zero.

At step 362, the CCD 22 reports a miss for the line containing the data requested by processor 2. This causes the SCE 54 to issue XI commands to all other processors 4. These commands cause any processors that hold the line, necessarily sectored, to write any changed DWs to main memory 60 before processor 2 refetches the data. At step 364, the data is provided by main memory 60 to SCE 54, which provides it to cache array 18, which in turn provides it to processor 2.

If the operation at step 352 is a store, the processor 2 is denied access to the data unless both the VDW bit 126a and the EXDW bit 126b have values of one. If both VDW and EXDW are set to one, it is a hit and the data is provided to cache 18 by processor 2 at step 388.

If, at step 378, VDW is one but EXDW is zero, then at step 380 a fetch-no-data request is initiated. This request causes a sectored XI command to be issued by CCD 22 over bus 46 to the SCE 54. If no other cache 20 holds the line sectored at step 382, then exclusive control is immediately provided to CCD 22 at step 384. If, however, any of the other caches 20 holds the line sectored, the SCE 54, at step 386, sends sector invalidation requests, via bus 48, to all remote cache control and directories 24 that hold the line sectored. The remote CCD 24, in turn, sends the invalidation request to the remote SLD 32 which sets the appropriate VDW bit zero in the remote VECBA. After the XI command has been issued, the CCD 22 marks the DW exclusive in the SLD 30 and the store operation may proceed.

If the operation at step 352 is a store and the requested DW is marked as invalid in the SLD 32, then the DW is held exclusive by another processor and the line may no longer remain in the SLD. At step 390, all of the changed DWs in the line are castout, and XIs are sent to all other processors. These operations are similar to those taken for a fetch to a word held exclusive by a remote processor at steps 358, 360, 362 and 364. After the XI commands have been issued, the SCE issues a fetch request for data in the line. This data is stored in the cache 18, the V and E bits for the line are set in the CCD 22 and processor 2 is allowed to store data in the addressed DW.

If, at step 352, the line is sectored and the operation requested is an XI command from a remote processor, the CCD 22, at step 366, provides the address of the requested line to the SLD input address and request logic 114 via bus 26'. The CCD 22 also indicates that the request is an XI, at step 366. The address of the DW for which the XI was issued is sent to the SLD input and select logic 116 via the bus 26". The CHDW bits 126c for the DW in the line are then sent to the CCD 22 via the bus 26'''. If, at step 368, the CCD 22 determines that the request is for a DW that has been changed, the CCD 22 sends an invalidate request to the SLD 30 for the line, and performs a partial castout (i.e. writes the changed DW to the memory 60). In addition, the CCD 22, at step 370, resets the V bit for the line in the CCD 22 to zero. The requested line may now be placed under the exclusive control of remote processor 4, and fetched from main memory 60.

If the requested DW has not changed at step 368, the VDW bit for the line is reset to zero at step 374. The V bit indicating that the line is valid and the S bit, indicating that the line is held shared exclusive, are set by the CCD 22. When these steps have been performed, the requested DW may be placed under the exclusive control of the requesting remote processor 4.

The invention may readily be extended to a second embodiment for store-through cache management systems using WTWAX. Although the hardware logic within the CCD 22, the SLD 30, the MLS 34, the SCE 54 and the main memory 60 will differ, FIG. 1 is still an accurate representation of this embodiment. In a WTWAX system, the operation is almost identical, except that both full (non-sectored) lines and sectors (from changed, sectored lines) are stored back to main memory 60 at the time the stores are issued. This is in contrast to the embodiment described above, in which data is stored into the memory 60 only in response to XIs and CEROs. There are no castouts in this WTWAX system. An XI or CERO causes a change to the exclusive status of a line or sector, but does not cause any data to be written to main memory.

The second embodiment of the invention works in almost the same way as the first embodiment. As in the first embodiment, when a remote processor issues an XI command in order to write to a line in the MLS 34, a check is made to determine whether the local processor has modified (and is likely to modify again) the requested DW or any of the other DW in the line. If the same DW has been modified by the local processor 2, then the line is invalidated in the local cache 18; it is not sectored. If the local processor 2 has not modified the same DW, then the line can be added to the SLD 30 and discarded from the MLS 34. The main difference between the XI command for the WTWAX embodiment of the invention and for the store-in cache embodiment is that, in the former, there is no delay while waiting for an invalidated line to be written back to main memory.

The advantages and disadvantages of using the WTWAX cache instead of a store-in cache are the same for the dynamically sectored cache as for the conventional cache. The store-in cache has delays during XIs while a changed DW is castout to main memory. The store-through cache produces fewer delays, but it may need much greater bandwidth between the cache and main memory 60 to accommodate the additional traffic since each store operation results in a write to the main memory 60.

In the prior art systems that were described above in the background and in reference to FIG. 2, when two processors alternately access the same line, castout and fetch operations occur each time a different processor accesses the line. While this "Ping-Ponging" of access privilege may degrade performance, it serves to maintain coherency. A third embodiment of the present invention provides a mechanism to maintain coherency and eliminate "Ping-Ponging," whether the processors are accessing the same DW or different DWs.

U.S. Pat. No. 4,445,174 to Fletcher describes a mechanism which uses an additional cache memory shared among multiple processors. Each processor has a private store-in buffer cache, and each processor shares a common cache and a main memory with the other processors. Lines that are both shared and changed by two processors are stored in the common shared cache, each processor may access any line in the shared cache directly for both fetch and store operations. Fletcher's method offers better performance than the dynamically sectored private cache when both processors are accessing the same DW, and the dynamically sectored cache provides better performance when different DWs are accessed.

Figure 9:
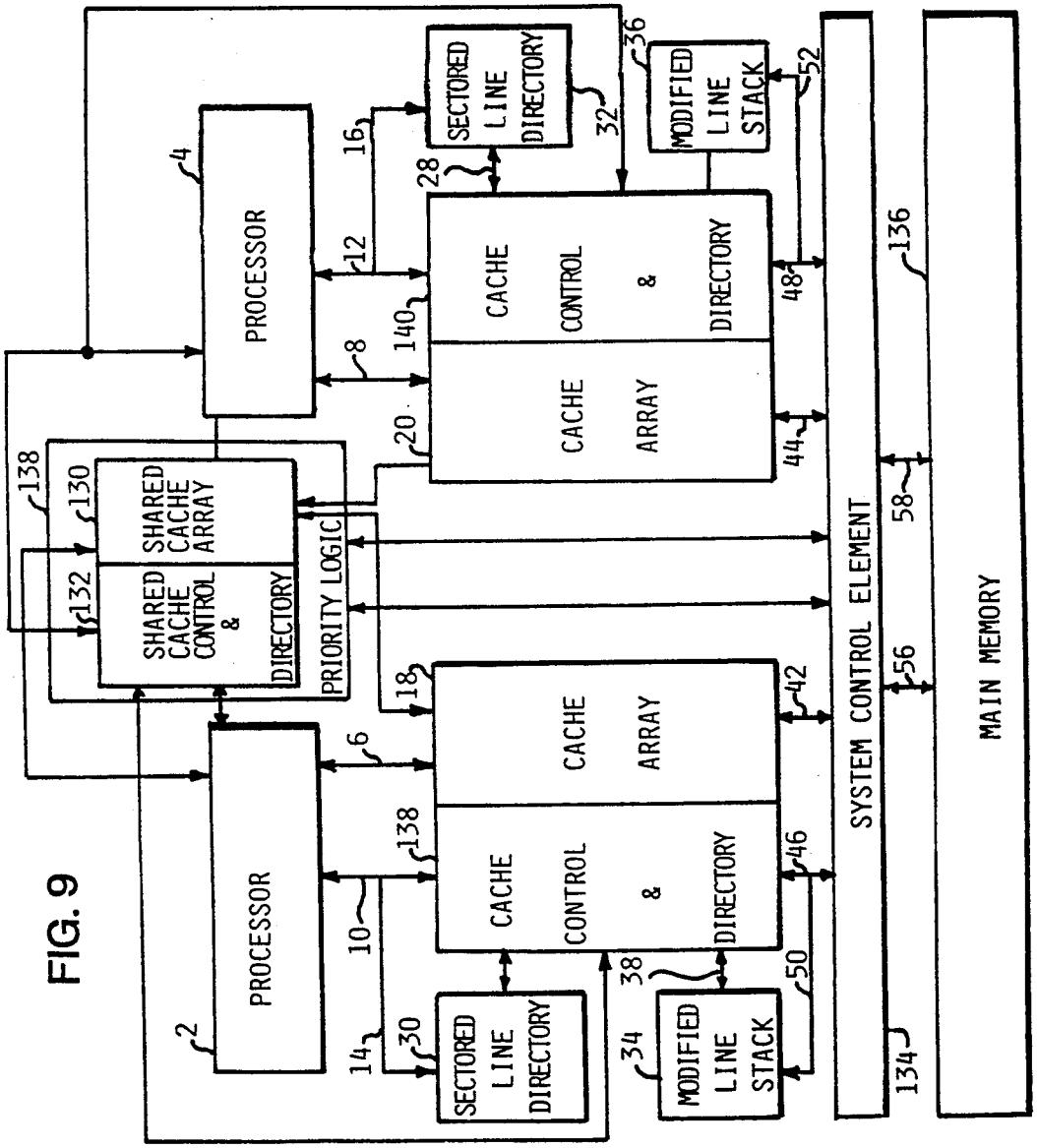
FIG. 9 is a block diagram of another embodiment of the invention which includes both private and shared caches.

FIG. 9 shows the third embodiment of the invention, which implements features of the present invention in a shared cache environment. In this embodiment, A shared cache control and directory (SCCD) 132 and shared cache array (SCA) 130 are added to the circuitry shown in FIG. 1. Furthermore, the private CCDs 138 and 140, the SCE 134 and the main memory 136 have additional logic which allow them to exchange data with the shared cache 130.

The SCA 130 operates as a conventional cache memory in that it stores data, and not status information. The SCA 130 used in this embodiment of the invention has space for only 4 to 8 lines and, as such, is much smaller than the private cache memories 18 and 20. Unlike the cache array 18, which is a store-in cache, the SCA 130 is a store-through cache. The purpose of the SCA 130 is to allow multiple processors to access the same DW without Ping-Ponging and without the need to castout the line with each access. The store-through scheme is more efficient for this purpose. Exclusive management is not desired, so that each processor may readily access the SCA data. Since each processor accesses the SCA 130 directly, there is no need for multiple read only copies of the same line of data, simplifying the task of maintaining a coherent view of the SCA by all processors. One further difference between the SCA 130 and cache array 18 is the CPU priority logic network 138, that determines which processor 2 or 4 or the SCE 134 receives priority when concurrent requests occur to access the same line in the SCA 130.

When any line is first referenced by processor 2, it is placed in private cache 18. Stores to and fetches from the local private cache 18 are handled the same way as in the first embodiment of the invention. When a line in cache 18 is modified, an entry is created in the MLS 34, identifying the specific DWs which have changed.

Once an entry for a line is created in the MLS 34, it is updated with each store by the local processor 2, to track which DWs have been modified. When a cross invalidate (XI) is received from a remote processor 4, SCE 50 provides the address of the invalidated lines to the MLS 34. If the line has been recently modified, the address and the changed bit vector (CDW) 108a-n are provided to CCD 22 by the MLS 34, as in the first embodiment.

At this point, the entry in the MLS is marked invalid and the CDW 108a-n are reset to zero, as the MLS entry is no longer needed (CCD 22 has the CDW information and can provide it to the SLD or SCCD, if necessary).

CCD 22 checks the XI requested address to see if the requested DW has been recently modified, as indicated by the CDW values 108a-n previously provided by the MLS 34. If the requested DW has not recently been changed, the line is sectored as in the first embodiment of the invention.

If, however, the requested DW has been recently modified, then the CCD 22 passes the address of the line for which the XI was issued to the SCE 54. SCE 54 then directs the transfer of the line of data to the shared cache control and directory (SCCD) 132, and to the shared cache array (SCA) 130.

If a line is to be replaced from the SCA 130 and SCCD 132, an LRU scheme is used to determine which line to delete from the SCA. The valid bit is reset to zero for the selected line in the SCCD 132. Space is then available in the SCA 130 to store a new line. The address is entered into SCCD 132 and the line of data is entered in SCA 130. The line is then invalidated in the CCD 22. Lines which are stored in SCA 130 are not retained in either of the private caches 18 or 20.

When the local processor 2 wishes to fetch from, or store to, a line, it will request the line from CCD 22, as in the first embodiment. Most operations in this third embodiment will proceed in the same fashion as in the first embodiment. If a line is stored in private cache 18, store and fetch operations are handled in the same manner. If a line is sectored, the operations are also handled in the same manner as in the first embodiment. In the event of a cache miss in private cache 18, however, whether the operation is a store or a fetch, the third embodiment provides additional capabilities beyond those provided in the first embodiment.

When a miss is detected, before any XI requests are issued to any remote processors, local processor 2 can directly interrogate the SCCD 132. If the requested address is resident and valid in SCCD 132, the requested data line is provided to processor 2 for both fetch and store operations. Since the line is available for stores by any processor, and since the processor requesting the store operation interrogates the SCCD 132 before issuing XI commands to other private caches, there is no processing of XI commands by the shared cache.

In the first embodiment of the invention, when a line is sectored, each DW within the line may only be changed or held shared-exclusive by one processor. If a given DW in a line DW has been changed by the local processor and a second processor attempts to gain exclusive control over that DW, the entire line is castout and invalidated in the SLD 30. With the shared cache available, a sectored line may be transferred to the SCA 130 in the same way that a line is moved from a private cache 18 to the shared cache.

Once a line is entered into the SCA 130, it remains there until it is replaced as the least recently referenced shared line. The transfer of lines from the private caches 18, 20 to the shared cache is a one-way transfer. This restriction applies to both sectored and non-sectored lines in caches 18, 20.

Enhanced performance is achieved through the use of sectored private cache lines for multiprocessor stores to a disjoint set of DWs, and shared cache lines for multiprocessor stores to the same DWs, This enhanced performance is not available using either component system alone.

It is understood by one skilled in the art that many variations of the embodiments described herein are contemplated. These include different numbers of processors, different modified line stack size, different sectored line directory size, different shared cache array size, different cache replacement algorithms, and different cache management algorithms. The effect of any of these changes would be readily understood by one of ordinary skill in the art. While the invention has been described in terms of an exemplary embodiment, it is contemplated that it may be practiced as outlined above with modifications within the spirit and scope of the appended claims.

The invention claimed is:

1. In a computer system which includes a shared main memory, at least two processors, each processor being coupled to a respective cache memory, and a system control element for coupling the cache memories to the shared main memory, apparatus for managing access to data in cache memories said apparatus comprising:

means for identifying, in one of said cache memories, a data line that has been referenced by at least two of the processors, said data line being identified if each data word in said data line has been referenced by at most one of the processors;

means for providing simultaneous write access to the processors which have accessed data words in the identified line, the respective processors writing to respectively different words in respective copies of said identified line, the respective copies of said identified line residing in respective cache memories; and means for preventing more than one processor from gaining simultaneous write access to any one work in said line.

2. In a computer system which includes a shared main memory, a system control element, and at least two processors, each processor having a respective private cache memory holding lines of memory words, apparatus for managing access to the words in the cache memories, said apparatus comprising:

means for identifying a line in one of the cache memories that has been referenced by two of the processors, such that each work in said line has been reference by at most one of the processors;

means for providing exclusive control to each processor over any words which have been modified by that processor within a copy of said identified line in the private cache memory of that processor, at least two respective processors being provided exclusive control over respectively different words in said identified line simultaneously;

means for invalidating those words in each private cache memory that have been modified by a processor other than that to which the cache is private; and means for providing read-only access to all processors for those words which have not been modified by any processor since being made resident in any of the cache memories.

3. In a computer system including a plurality of processors, a shared main memory and a system control element, wherein each processor has a respective cache memory and each cache memory holds lines of memory words, apparatus for managing access to the memory words comprising:

first identification means, coupled to each processor, for identifying data lines in the cache memories that have been modified by the processor;

second identification means, coupled to each processor, for identifying each data line in each cache memory that contains a first word which has been modified by a first one of said processors and a second word which has been accessed by a second one of said processors;

first control means, coupled to said system control element and responsive to a request from one of said processors to gain access to a word in a line of one of said cache memories, for determining, from said first identification means, whether said line contains a word to which another one of said processors has been given access and has modified said word; and second control means, responsive to the determination by the first control means, for transferring the line from the first identification means to the second identification means and for preventing two processors from gaining simultaneous access to any one word in the line when one of the two processors has write access to the word, said second control means including means for providing simultaneous write access tot he two processors, the respective processors accessing respectively different data words in respective copies of the line residing in respectively different cache memories.

4. The system set forth in claim 3 wherein:

said first identification means further includes modified word identification means for identifying memory words which have been changed since being made resident in one of said cache memories;

said second identification means further includes sectored line directory means for identifying individual words within a line as either being under exclusive control, under read-only control or unavailable for access by any one of said plurality of processors; and said second control means includes sectoring means for identifying, in said sectored line directory means, a line containing a first word which has been modified by said first processor and a second word which has been referenced by at least one other processor since being made resident in the respective cache memories of said first and second processors.

5. The system set forth in claim 4 wherein said second control means further includes:

shared exclusive control means for providing one of said plurality of processors exclusive control of a word within any line that is resident in the cache memory associated with the one processor, if said sectored line directory means indicates that no other processor has exclusive control over the word;

means for providing said one processor access to store into a word in the associated cache memory, over which word the one processor has exclusive control;

means for providing access, to the one processor, to fetch a further word from the associated cache memory, over which further word no other processor has exclusive control; and means for the one processor to invalidate a word in the cache memory associated with another processor.

6. The system set forth in claim 3 wherein said second control means further comprises:

shared exclusive control means for providing one of said plurality of processors with exclusive control over a selected word within a line that is resident in the cache memory of the one processor at the same time that the line is resident in the cache memory of another processor, when no other processor has exclusive control over the selected word;

means for providing access to the one processor to store data into a word over which the processor has exclusive control, while the line remains resident in the cache memory of another processor;

means for providing access to the one processor to fetch a word over which no other processor has exclusive control, while the line remains resident int h cache memory of another processor; and means for the one processor to invalidate a word in the cache memory of another processor without invalidating the entire line in which the word is contained.

7. In a system, including a plurality of processors, a shared main memory and a system control element, where each processor has a cache memory which holds lines of memory words, apparatus for managing access to data in cache memories comprising:

modified line identification means for identifying data words which have been changed since the lines which contain the words were made resident in one of said cache memories;

sectoring means for marking a line in which a first word has been modified by one processor and a second word has been referenced by at least one other processor since being made resident in the cache;

sectored line directory means, responsive to said sectoring means, for identifying individual words within a line marked by the sectoring means as being unde_ exclusive control, being under read-only control of a given processor or being invalid; and shared exclusive control means for allowing each processor to store information into words within the marked lines only if thy are under said exclusive control of the given processor, and to fetch information only from words in said marked lines which are marked as being under exclusive or read-only control, said shared exclusive control means including means for providing the respective processors simultaneous write access to respectively different data words in respective copies of the marked lines, each respective copy residing in a respectively different cache memory.

8. The system set forth in claim 7 wherein the modified word identification means includes a memory element into which respective cache addresses of words are stored when the words are referenced for store operations.

9. The system set forth in claim 7 wherein the sectored line directory means includes a memory element into which data are stored, identifying whether each respective word in a line is valid for read access, whether each respective word is held under exclusive control for write access, and whether each respective word has been changed while resident in the cache.

10. In a system, including a plurality of processors, a shared main memory, a system control element and a shared cache memory, where each processor has a respective private cache memory which holds lines of memory words, apparatus for managing access to data in cache memories comprising:

identification means for identifying a data line in a private cache memory that has been referenced by at least two of the processors while resident in at least one private cache memory, such that each data word in said data line has been referenced by at most one of the processors;

control means, responsive to said identification means, for providing simultaneous write access to the processors which have accessed data words in the identified line, each respective processor accessing a respectively different word in a respective copy of the identified line in the respective private cache memory of that processor;

further identification means for marking as shared a data line in cache memory which has been referenced by at least two of the processors while resident in a private cache memory, such that at least one data word in said data line has been referenced by at least two of the processors; and further control means, responsive to said further identification means, for storing said data line marked as shared by said further identification means into the shared cache memory, and for invalidating all copes of said data line marked as shared in the private cache memories.

11. In a computer system which includes a shared main memory, a system control element, and at least two processors, each processor having a respective private cache memory, a method for managing access to data in cache memories said method comprising the steps of:

identifying a data line in cache memory that has been referenced by at least two of the processors, such that each data word in said data line has been referenced by at most one of the processors;

providing simultaneous write access, for writing to respectively different words in the identified line, tot he processors which have accessed data words in the identified line, each respective processor accessing a respective copy of the identified line in the respective private cache memory of that processor; and preventing more than one processor from gaining simultaneous write access to any one word in said data line.

12. In a computer system which includes a shared main memory, a system control element, and at least two processors, each processor having a respective private cache memory holding lines of memory words, a method for managing access to the words in the cache memories, said method comprising the steps of:

identifying a line in one of the cache memories that has been referenced by two of the processors, such that each word in said line has been referenced by at most one of the processors;

providing exclusive control simultaneously to each processor over any words which have been modified by that processor within said line referenced by two processors, each respective processor accessing a respectively different word in a respective copy of the line in its respective private cache memory;

invalidating those words in each private cache memory that have been modified by another processor;

providing read-only access to all processors for those words which have not been modified by any processor since being made resident in any of the cache memories.

13. In a computer system which includes a shared main memory, a system control element, and at least two processors, each processor having a private cache memory for holding lines of memory words, a method for managing access to data in cache memories, said method comprising the steps of:

identifying data words which have been changed since the lines containing said data words were made resident in said cache memories;

identifying as sectored each line which has been changed by one of the processors and referenced by at least one other processor since being placed in cache, and for which no single word in said line has been referenced by more than one of the processors;

identifying the control status of individual words within said sectored lines, each word being under exclusive control of one of said processors, being under read-only control of one of said processors, or being invalid;

enabling each processor to store into words within said sectored lines only if said words are identified as being under the exclusive control of the processor, and to fetch only from those words within said sectored lines which are identified as being under exclusive or read-only control of the processor; and enabling at least two respective processors to simultaneously store into respectively different words in respective copies of the sectored lines, the respective copies of the sectored lines residing in the respective private cache memories of said two processors.

14. In a computer system which includes a shared main memory, a system control element, and at least two processors, each processor having a private cache memory which holds lines of memory words, a method for managing access to the memory words in the cache memories, said method comprising the steps of:

a) recording the addresses of lines which have been caged since being made resident in the cache memory of each processor;

b) recording the location of each data work which has been changed within the lines with said recorded addresses;

c) setting a status flag to identify as sectored a line which has been changed by one processor and referenced by at least one other processor since being placed in the cache, and for which no single word in said line has been referenced by more than one processor, the system control element performing the setting of the status flag;

d) recording access restriction for the individual words within each of the lines which have been identified as sectored, said access restrictions indicating that each word is under exclusive control of one of said processors, is under read-only control of one of said processors, or is invalid; and e) enabling each respective processor to store into words within said sectored lines only if the access restrictions indicate that the words are under the exclusive control of the respective processor performing a store operation, and to fetch from words within said sectored lines only if the access restrictions indicate that the words are under exclusive or read-only control of the respective processor performing a fetch operation;

f) enabling on of said processors to receive exclusive control of a word in one of said sectored lines which is held in the cache memory of another processor without invalidating the entire line in the cache memory of said other processor, while said other processor simultaneously retains exclusive control over a further word in said one sectored line, said further word being different from said word; and g) invalidating the word in the cache memory of the other processor, using the system control element, in response tot he request for exclusive control by the one processor.

15. The system set forth in claim 14 wherein the step (d) includes the steps of:

setting an exclusive flag to indicate that the one processor has exclusive control over each word which has been modified by the one processor while resident in the cache memory of the one processor; and setting a valid flag to indicate that the processor has a valid copy of each word which has not been modified by another processor wheel resident in the cache memory of the one processor.

16. The system set forth in claim 14 wherein the addresses of changed lines and sectored lines are replaced with the addresses of more recently changed lines and sectored lines using a least recently used algorithm to select the addresses to be replaced.

17. In a computer system which includes a shared main memory, a shared cache memory, a system control element, and a plurality of processors, each processor having a private cache memory for holding lines of memory words, a method for managing access to the words in the cache memories, said method comprising the steps of:

identifying which data lines in private cache memory have been referenced by two of the plurality of processors while resident in at least one private cache memory, such that each data word in said identified data lines has been referenced by only one of the plurality of processors;

providing, for the two processors, simultaneous access to respective copies of one of said data lines referenced by the two processors, said respective copies being stored in the respective private cache memories of said processors, wherein each data word in said one data line has been referenced by only one processor;

marking as shared those data lines in cache memory which have been referenced by two of the plurality of processors while resident in private cache memory, such that at least one data word in each of said data lines has been referenced by the two processors; and storing into shared cache memory said data lines marked as shared; and invalidating all copies of said data lines marked as shared in private cache memories.

* * * * *